Nov. 11, 1969  G. LAURIEN  3,477,132
DEPTH MEASURING DEVICE
Filed Dec. 29, 1967  3 Sheets-Sheet 1

Inventor:
Günter Laurien

By
Michael S. Stroker
his Attorney

Nov. 11, 1969   G. LAURIEN   3,477,132
DEPTH MEASURING DEVICE

Filed Dec. 29, 1967   3 Sheets-Sheet 3

Inventor:
Günter Laurien
By
his Attorney

United States Patent Office 3,477,132
Patented Nov. 11, 1969

3,477,132
DEPTH MEASURING DEVICE
Günter Laurien, Bad Waldliesborn, Germany, assignor to Wilfried Kollmann, Werl-Aspe, Germany
Filed Dec. 29, 1967, Ser. No. 694,635
Claims priority, application Germany, Jan. 4, 1967, K 61,085
Int. Cl. G01f 23/04; G01b 3/28
U.S. Cl. 33—126.6     18 Claims

ABSTRACT OF THE DISCLOSURE

A depth measuring device comprises a hollow housing for a vertically movable float which normally rests by gravity on one or more flanges of a reel. A sounding line is coiled onto the core of the reel and carries a weight which descends onto the bottom below a body of water when the housing is placed into water so that the float rises by buoyancy and releases the reel. The latter can form part of a counter which furnishes indications as to that length of the sounding line which passes thereover during descent of the weight. Also, the reel can carry a length of convoluted cord which can be coupled to a fishline if the user wishes to cast the depth measuring device by means of a fishing tackle. A releasable blocking device prevents rewinding of the sounding line during withdrawal of the housing from water.

BACKGROUND OF THE INVENTION

The present invention relates to improvements in depth measuring or sounding devices, particularly to improvements in devices which can be employed by fishermen for sounding of rivers, ponds or other bodies of water.

A careful fisherman will try to determine the depth of water prior to casting the bait because knowledge of the depth of water enables him to properly locate the float on the fishline. As a rule, fishermen utilize a piece of lead or another weight which is simply tied to the fishline and dropped into water. The setting of the float is determined by guessing and such setting is changed as often as necessary in order to determine the exact depth. A serious drawback of the just outlined procedure is that the fisherman is likely to scare the fish away. Furthermore, much time is lost for repeated casting of lead, for tying of the lead to and for detachment of the lead from the fishline. Moreover, it requires a certain amount of skill and experience to determine the exact depth.

SUMMARY OF THE INVENTION

It is an object of my invention to provide a simple, inexpensive and lightweight depth measuring device which can be carried along by fishermen, swimmers, divers and other persons interested in determining the depth of rivers, ponds, seas and other bodies of water.

Another object of the invention is to provide a device which can determine the depth of bodies of water without experimentation, i.e., on the first try, and which can furnish exact readings or can provide other types of indications of the results of soundings.

A further object of the invention is to provide a depth measuring device which can be placed into water by hand or by casting with a fishing tackle.

An additional object of the invention is to provide a device which can be manipulated by unskilled persons, which can be reused as often as desired, and which can be used by children or adults.

An ancillary object of the invention is to provide a novel method of casting a leaded sounding line.

A concomitant object of the invention is to provide a device which cannot sink in water and which can determine the depth of bodies of water without scaring away the fish.

Briefly outlined, the improved depth measuring device comprises a support or housing which can resemble an upright cylinder or shell, a buoyant member (e.g., a suitable float) mounted in or on the support for movement to and from an idle position which it tends to assume by gravity and being compelled by buoyancy to automatically leave such idle position when the support is placed into a body of water, a rotary element (e.g., a reel or pulley) journalled in the support and being engaged by the buoyant member when the latter assumes it idle position so that the buoyant member then prevents rotation of the rotary element but allows the latter to rotate when the support is placed into water, a flexible line trained around the rotary element, and a weight or lead attached to the line. The weight is free to rotate the rotary element by way of the line and to descend to the bottom when the buoyant member leaves its idle position.

The rotary element can actuate an automatic counter serving to furnish indications as to that length of the line which passes over the rotary element during travel of the weight to the bottom. Alternatively, the rotary element may constitute a twin reel which carries a supply of convoluted sounding line for the weight and a supply of a coupling line or cord which can be attached to a fishline so that the support can be cast into water from shore of from a boat. The cord and the sounding line are coiled in opposite directions and the reel is preferably provided or cooperates with a blocking device which normally prevents rewinding of the sounding line, as well as with a braking device which controls the speed of rotation of reel during unwind of the sounding line. The breaking device may form an integral part of the blocking device or vice versa, and a portion of the blocking device may form part of the reel.

The novel features which are considered as characteristic of the invention are set forth in particular in the appended claims. The improved depth measuring device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
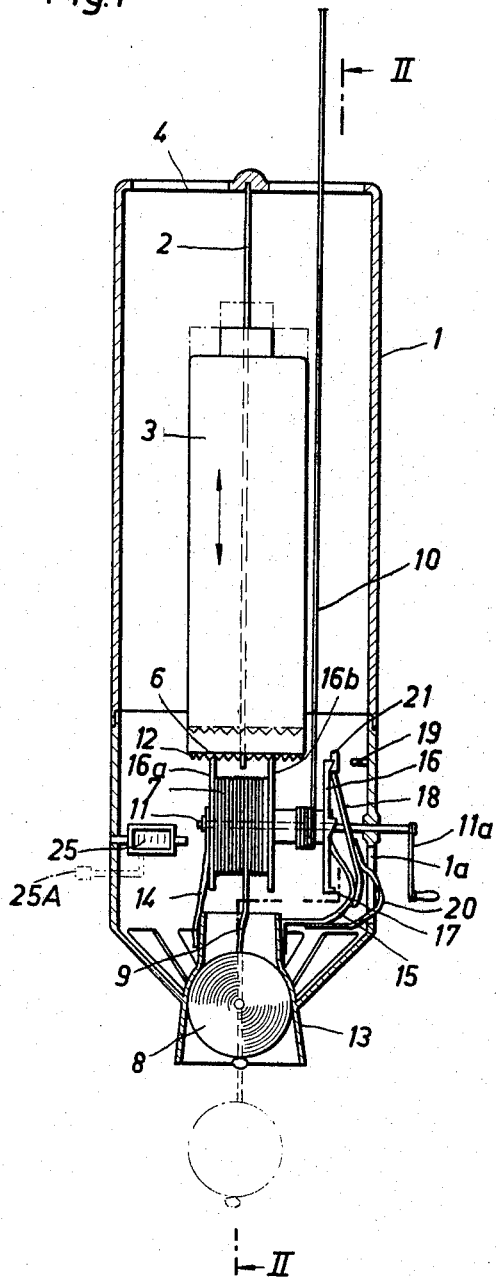
FIG. 1 is a longitudinal vertical sectional view of a depth measuring device which embodies one form of my invention.
Figure 2:
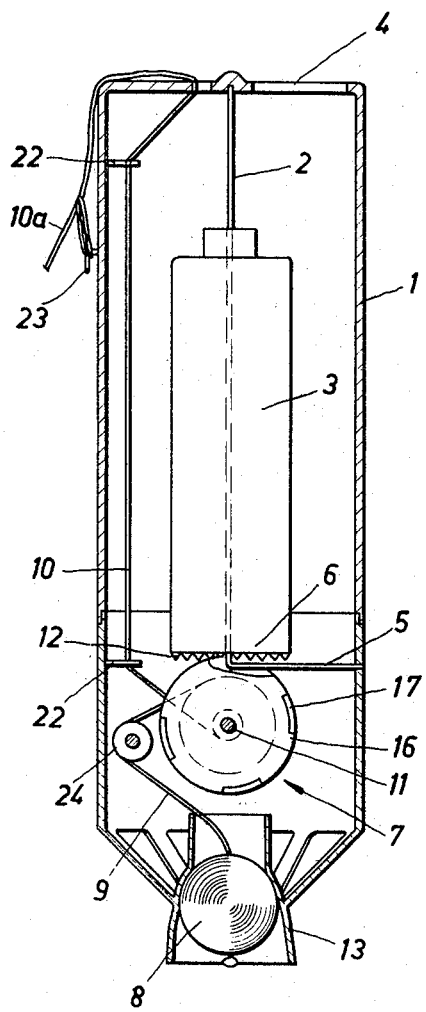
FIG. 2 is a sectional view substantially as seen in the direction of arrows from the line II—II of FIG. 1.

The depth measuring device of FIGS. 1 and 2 comprises an elongated housing or support 1 resembling a hollow cylinder or shell and accommodating a centrally located guide member 2 which resembles a shaft. This shaft serves as a guide for a vertically reciprocable buoyant member or float 3. The upper end portion of the shaft 2 is mounted in the hub of a cruciform bearing 4 having radially extending prongs affixed to or integral with the housing 1. The lower end portion of the shaft 2 is bent horizontally, as at 5, and is affixed to the housing 1. The latter further supports a horizontal shaft 11 which is located at a level below the end portion 5 of the guide shaft 2 and supports a rotary element here shown as a twin reel or spool 7. The distance between the shafts 2 and 11 is such that the lower end portion 6 of the float 3 can come to rest by gravity on two flanges 16a, 16b of the reel 7. This end portion is provided with a corrugated, serrated, toothed or otherwise knurled or milled liner or layer 12 which can frictionally engage the flanges 16a, 16b in order to hold the reel 7 against rotation when the float 3 assumes the idle or lower end position shown in FIGS. 1 and 2. The flange 16b is the intermediate flange of the reel 7. That portion of the core of the reel 7 which extends between the flanges 16a, 16b serves to support a supply of convoluted sounding line 9 the lower end portion of which carries a lead or weight 8. The other half of the core of the reel 7 extends between the intermediate flange 16b and a second outer flange 16 and serves to support a supply of convoluted coupling line or cord 10. The line 9 and cord 10 are convoluted in opposite directions. The upper end portion 10a of the cord 10 can be connected to a fishline if the user wishes to cast the depth measuring device into water at a considerable distance from a boat or from shore.

When the housing 1 is dropped or placed into water, it sinks partially due to its own weight and also owing to the weight of its contents, whereby the water penetrates into the interior of the housing and causes the float 3 to rise by buoyancy so that its lower end portion 6 moves the liner or layer 12 away from the flanges 16a, 16b and permits the reel 7 to turn in response to gravitational descent of the lead 8, i.e., the sounding line 9 unwinds and the cord 10 is taken up by the core of the reel. In the embodiment of FIGS. 1 and 2, the liner 12 on the lower end portion 6 of the float 3 consists of rubber or elastomeric plastic material and is provided with prongs or teeth which engage the flanges 16a, 16b with requisite friction to prevent unwinding of sounding line 9 unless and until the float 3 is caused to rise along the shaft 2.

The lower end portion 13 of the housing constitutes a downwardly and outwardly flaring magazine for the lead 8, and the underside of this magazine is open to permit unimpeded descent of the lead when the reel 7 is free to turn. The upper end of the magazine 13 is also open to permit passage of the sounding line 9. The latter can be coiled onto the core of the reel 7 by means of a crank handle 11a affixed to the shaft 11 externally of the housing 1. The purpose of the magazine 13 is to prevent swinging of the lead 8 during casting of the depth measuring device by means of a fishline or the like. Such swinging of the lead 8 could cause the housing 1 to wobble in flight.

The shaft 11 for the reel 7 is journalled in one side wall of the housing 1 and in two brackets 14, 15 which resemble rails and are attached to the upper portion of the magazine 13.

In order to prevent uncontrolled rewinding of the sounding line 9 after the lead 8 reaches solid ground, for example, the bottom of a river or pound, the depth measuring device is provided with disengageable or releasable blocking means which normally prevents rotation of the reel in one direction, namely, in that direction which is necessary to collect the line 9 on the core of the reel. This blocking means comprises a ratchet wheel which forms an integral part of the flange 16 and a pawl 21 mounted on a resilient arm or spring 18 secured to the bracket 15. A portion 20 of the arm 18 extends through a slot 1a in the housing 1 and can be grasped by hand to disengage the pawl 21 from the teeth 17 on the outer face of the flange 16. The configuration of teeth 17 is such that they can prevent rotation of the reel 7 in a sense to collect the sounding line 9 when the pawl 21 bears against the flange 16. The pawl 21 is biased by the spring 18 with a force which suffices to provide a certain braking action, i.e., to prevent too rapid descent of the lead 8 toward the bottom because such rapid descent could cause turbulence which would scare the fish. Moreover, rapid unwinding of the line 9 is undesirable when the bottom is muddy because the rapidly descending lead 8 could raise a cloud of mud which would also scare the fish. Each tooth 17 has a substantially radially extending flank and a strongly inclined flank, and the pawl 21 permits rotation of the flange 16 in a sense to move the teeth 17 along the pawl in a direction to cause the pawl to slide along the inclined flanks. A retaining hook 19 in the interior of the housing 1 can engage and hold the pawl 21 in response to a pull on the portion 20 of the spring 18 so that the pawl then remains disengaged from the flange 16 and the user is free to rotate the handle 11a in order to collect or take up the sounding line 9. The pawl 21 may consist of hard rubber which produces desirable braking action during unwinding of the line 9 and also damps noise so that fish are not scared away during sounding. It is desirable to avoid the generation of any noise because water is a good conductor of sound.

The interior of the housing 1 is further provided with one or more eyes or guides 22 for the cord 10. The latter extends upwardly between two prongs of the bearing 4 and its looped end portion 10a can be temporarily connected to a hook-shaped retainer 23 provided at the outer side of the housing as shown in the upper part of FIG. 2. The end portion 10a can be readily disengaged from the hook 23 if the user wishes to attach the cord 10 to a fishline.

The line 9 may be provided with marks to indicate various depths. In addition to or as a substitute for such marks, the depth measuring device of my invention may be provided with a resettable automatic counter 25 which can be observed upon withdrawal of the housing 1 from water to indicate the depth measured by the line 9 and lead 8. The counter 25 is of known design and comprises one or more numbered discs and a wheel or roller 24. The sounding line 9 is trained around the wheel 24 in a region between the core of the reel 7 and the magazine 13 and, since the line 9 is tensioned by lead 8, it causes the wheel 24 to rotate while the lead descends to the bottom. The observation window of the counter 25 is positioned in such a way that it can be seen from outside, i.e., from the exterior of the housing 1. To this end, the housing may be provided with an opening in registry with such observation window at least a portion of the housing may consist of transparent material. False readings are neither likely nor possible because the pawl 21 prevents rewinding of the line 9 onto the core of the reel 7 and because the cord 10 is under tension when the housing 1 is being withdrawn from water. Since the cord 10 and the line 9 are coiled in opposite directions, a pull on the cord prevents further unwinding of the line.

When the depth measuring device of FIGS. 1 and 2 is ready for use, the end portion 10a of the cord is attached to the hook 23 or to a fishline and the lead 8 is accommodated in the magazine 13. The device then resembles a compact cartridge. The weight of the float 3 suffices to hold the reel 7 against rotation when the housing 1 is held in upright position or sufficiently close to such upright position to enable the float 3 to move toward the lower end portion 5 of the guide shaft 2. Prior to casting the housing 1 into water by means of a fishing tackle, the fisherman can wind the fishline onto the reel of the fishing pole so that the end portion 10a is adjacent to the tip of the pole. This enables the fisherman to cast the housing at a desired distance from the shore or from the boat. The reel 7 cannot rotate during flight of the housing because centrifugal force causes the float to press the liner 12 against the flanges 16a, 16b of the reel. When the housing enters the water, the float rises and allows the lead 8 to descend to the bottom. If the cord 10 is short, a length of the fishline is simply coiled onto the core of the reel 7 during unwinding of the line 9. When the housing is withdrawn from water, the cord 10 is under tension and prevents further unwinding of the line 9.

In the absence of markings on the line 9 and in the absence of the counter 25, the user simply measures the length of the line 9 upon withdrawal of the housing from water.

It is further clear that the improved depth measuring device can be placed into water by hand, for example, from a boat or ship. It can be used by swimmers and particularly by non-swimmers to determine the depth of waters prior to entry. Also, the device can be dimensioned to serve as a means for sounding the depth of seas by deep sea fishermen or divers.

In accordance with a slight modification of my invention, the counter 25 can be provided with a releasable arresting device which normally prevents backward winding or turning of its disk or disks in response to collection of line 9 on the core of the reel 7. The arresting device is shown in FIG. 1 at 25A by phantom lines. This arresting device can be disengaged by the user upon withdrawal of the housing 1 from water to permit zero setting of the counter prior to next utilization of the device. If the counter 25 is provided with the arresting device 25A, the line 9 can be collected during withdrawal from water without any danger of altering the indications furnished by the counter. The arresting device 25A is of particular advantage if the housing 1 must be dragged to shore or to a boat in shallow waters or over a very uneven bottom in a river or pond.

Figure 3:
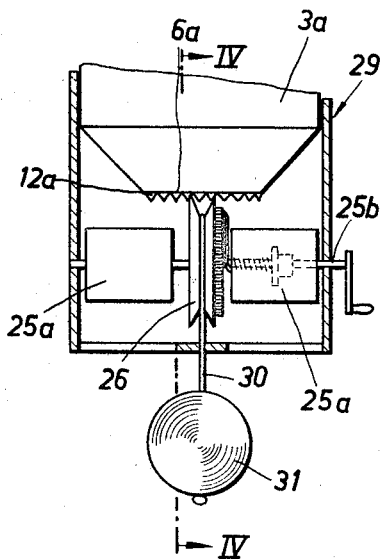
FIG. 3 is a fragmentary vertical sectional view of a second depth measuring device.
Figure 4:
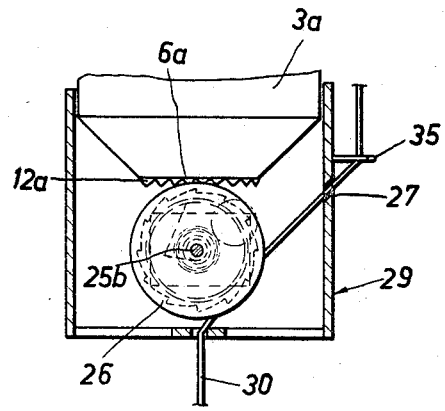
FIG. 4 is a sectional view as seen in the direction of arrows from the line IV—IV of FIG. 3.

FIGS. 3 and 4 illustrate a portion of a greatly simplified depth measuring device which comprises a hollow housing or support 29 for a vertically movable float 3a having a lower end portion 6a provided with a serrated layer 12a of rubber or the like. The layer 12a normally rests on both flanges of a rotary element 26 which resembles a pulley and has a V-shaped groove for at least one convolution of a line 30. This line may be a specially provided sounding line or the fishline on a fishing tackle. The lead at the lower end of the line 30 is shown at 31. The rotary element 26 forms part of a counter 25a and the latter's shaft 25b can drive the numbered disk or disks through the intermediary of a customary one-way coupling which permits the element 26 to rotate freely in a sense to move the lead 31 upwardly but changes the angular position of the disk or disks when the element 26 rotates in response to lowering of the lead. The line 30 forms at least one convolution in the groove of the element 26.

It is normally preferred to use a line 30 which is separable from the fishline so that the user need not attach the lead 31 and need not thread the fishline into the housing 29 and around the rotary element 26 prior to each sounding. The device of FIGS. 3 and 4 can operate properly without resorting to the blocking means of FIGS. 1 and 2 because the counter 25a is provided with the aforementioned one-way coupling which insures that the indications of depth are not altered during lifting of the lead 31 toward the housing 29.

The housing 29 is preferably provided with an opening 27 adjacent to the shaft 25b of the rotary element 26 to permit passage of the line 30. This line is also guided through an eye 35 positioned in such a way that the line 30 is caused to form at least one full convolution in the groove of the element 26.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. A depth measuring device, comprising a floatable support having at least one opening; a buoyant member mounted on said support for movement to and from an idle position, said support being adapted to be placed into a body of water whereby said buoyant member automatically floats from said idle position to swim on or close to the water surface; a rotary element journalled in the lower portion of said support and being engaged by said buoyant member in said idle position so that said member then prevents rotation of said element; a line trained around said rotary element; and a weight provided on said line, said weight being free to rotate said element by way of said line and to descend onto the bottom when said buoyant member leaves said idle position.

2. A depth measuring device as defined in claim 1, wherein said buoyant member is a float having a lower end portion provided with an uneven surface which engages said rotary element by friction to hold the latter against rotation in the idle position of said float.

3. A depth measuring device as defined in claim 1, further comprising disengageable blocking means for preventing rotation of said rotary element in a sense to lift said weight toward said support.

4. A depth measuring device as defined in claim 1, further comprising a counter provided on said support and having a wheel, said line being trained around said wheel to rotate the latter and to thereby operate said counter during lowering of said weight.

5. A depth measuring device as defined in claim 4, wherein said counter comprises releasable arresting means operative to prevent changes in readings furnished by said counter in response lifting of said weight toward said support.

6. A depth measuring device as defined in claim 1, further comprising braking means for controlling the speed of rotation of said rotary element while said weight descends toward the bottom of a body of water.

7. A depth measuring device as defined in claim 6, wherein said braking means comprises resilient means carried by said support and bearing against a portion of said rotary element.

8. A depth measuring device as defined in claim 7, wherein said portion of said rotary element is a flange having an end force provided with an annulus of teeth and said resilient means carries a pawl which bears against said end face to ride over said teeth while the weight descends.

9. A depth measuring device as defined in claim 8, wherein said pawl consists of sound deadening material.

10. A depth measuring device as defined in claim 1, wherein said support comprises a magazine located below said rotary element and arranged to accommodate said weight when the latter is moved to its upper end position.

11. A depth measuring device as defined in claim 1, wherein said rotary element is a twin reel having several flanges and a core, said line being coiled onto a first portion of said core and further comprising a coupling cord coiled onto a second portion of said core, said core and said line being coiled in opposite directions.

12. A depth measuring device as defined in claim 11, wherein said support comprises a retaining member and said cord comprises a free end portion which can be attached to said retaining member.

13. A depth measuring device as defined in claim 1, wherein said support is a housing having an upper portion which accommodates said buoyant member for substantially vertical movement to and from said idle position and a lower portion which accommodates said weight when the latter is moved to an upper end position, and further comprising bearing means provided on said lower portion of the support and rotatably supporting said rotary element.

14. A depth measuring device as defined in claim 1, further comprising counter means for indicating the length of that portion of said line which passes beyond said rotary element while the weight descends to the bottom, said counter means comprising a shaft carrying said rotary element, indicating means, and one-way coupling means connecting said shaft with said indicating means.

15. A depth measuring device as defined in claim 14, wherein said rotary element is a pulley having a groove and said line forms at least one convolution in said groove.

16. A depth measuring device as defined in claim 14, wherein said line is in the fishline of a fishing tackle.

17. A depth measuring device as defined in claim 14, wherein said support is provided with a guide for said line, said guide being located substantially at the level of said shaft.

18. A depth measuring device as defined in claim 1, wherein said rotary element comprises a core and at least one flange and said buoyant member has a lower end portion which engages said flange in said idle position thereof.

References Cited

UNITED STATES PATENTS

| | | | |
|---|---|---|---|
| 2,685,574 | 8/1954 | Johnson | 33—126.5 |
| 3,381,534 | 5/1968 | Ball | 33—126 |

WILLIAM D. MARTIN, JR., Primary Examiner

U.S. Cl. X.R.

33—138; 73—315